UNITED STATES PATENT OFFICE.

ALBERT BERTSCHMANN, OF BASLE, SWITZERLAND, ASSIGNOR TO THE FIRM OF SOCIETY OF CHEMICAL INDUSTRY IN BASLE, OF BASLE, SWITZERLAND.

AZO DYE AND PROCESS OF MAKING SAME.

SPECIFICATION forming part of Letters Patent No. 724,078, dated March 31, 1903.

Application filed November 7, 1902. Serial No. 130,381. (Specimens.)

*To all whom it may concern:*

Be it known that I, ALBERT BERTSCHMANN, a citizen of the Swiss Republic, and a resident of Basle, Switzerland, have invented new and useful Improvements in the Manufacture of Azo Coloring-Matters, of which the following is a full, clear, and exact specification.

The invention relates to the manufacture of new nitrobenzamidonaphtholsulfonic acids, of the corresponding amidobenzamidonaphtholsulfonic acids, and of new azo coloring-matters derived from these latter.

The new nitrobenzamidonaphtholsulfonic acids are obtained by the action of the chlorids of nitrobenzoyls on the 2.5.7 amidonaphtholsulfonic acid, while the corresponding new amidobenzamidonaphtholsulfonic acids are obtained by treatment of the said nitrobenzamidonaphtholsulfonic acids with reducing agents. The amidobenzamidonaphtholsulfonic acids, which are characterized by inclosing a diazotable amido group in the residue alphylacidyl not hydroxylated, constitute valuable primary materials for the preparation of azo coloring-matters capable of being developed on the fiber. These amidobenzamidonaphtholsulfonic acids, which can be precipitated in a generel way from their solutions in the form of alkaline salts by means of common salt or in the form of free acids by means of hydrochloric acid, are clearly distinguished from the amidonaphtholsulfonic acids from which they are derived in that they can by nitrous acid be transformed into diazo compounds, which by treatment with alkalies furnish red-yellow to red-blue coloring-matters and not violet to black coloring-matters, as do the diazo derivatives of the amidonaphtholsulfonic acids.

The azo coloring-matters resulting from the combination of the amidobenzamidonaphtholsulfonic acids with diazo bodies dye unmordanted cotton in yellow-red to blue-red tints and have the property of developing well on the fiber by being diazotized thereon and ultimately combined with amins or phenols, furnishing shades which are distinguished not only by their extreme fastness to washing, but also by their intensity and brilliance.

Indeed, if the new amidobenzamidonaphtholsulfonic acids are treated with the diazo derivatives of aromatic amido compounds in alkaline solution the radical "amidonaphthol" alone combines, while the radical "amidoalphylacidyl" remains intact, producing new azo coloring-matters which are distinguihed from known coloring-matters capable of being developed on the fiber and derived from amidonaphtholsulfonicacids in that they inclose the diazotizable group "amido," not in the nucleus inclosing the "oxy" or "azo" group, but in an independent form of this chromophore in the radical amidoalphylacidyl acting as a simple monamin.

*Preparation of nitrobenzamidonaphtholsulfonic acids and of amidobenzamidonaphtholsulfonic acids.*—Thirty-six parts, by weight, of 2.5.7-amidonaphtholmonosulfonic acid are dissolved in three hundred to four hundred parts water and the quantity of sodium carbonate necessary for neutralization. The solution has added to it twenty parts of sodium acetate and treated in a vessel provided with an agitator at ordinary temperature with sufficient chlorid of metanitrobenzoyl—for instance, thirty to forty parts—such that a sample taken from the mass having added to it hydrochloric acid and sodium nitrite gives no production of color by adding an alkali. The obtained nitrobenzamidonaphtholsulfonic acid, which readily separates partly in crystals, can be directly employed for producing the corresponding amidobenzamidonaphtholsulfonic acid. For the latter purpose there are added to the mass fifteen parts of acetic acid and in the course of several hours in small doses one hundred to two hundred parts iron finely subdivided, care being taken to agitate and heat until a sample neutralized by sodium carbonate appears colorless when poured. The boiling solution is then neutralized with sodium carbonate, separated by filtration from the iron mud, and the amidobenzamidonaphtholsulfonic acid is precipitated from it by adding hydrochloric acid in the form of a white precipitate and separated by filtration. This acid furnishes with nitrous acid a yellowish diazo derivative soluble with difficulty, which after the medium in which it exists is rendered alkaline furnishes a red coloring-matter soluble with difficulty. If in this example for the chlorid of metanitrobenzoyl be substituted the chlorid of orthonitrobenzoyl, or of paranitrobenzoyl, or the methylated, chlorinated, or alkyloxylated derivatives of the nitrobenzoylchlorids, or the chlorids of dinitrobenzoyls, there are in like manner obtained the corresponding amidobenzamidonaphtholsulfonic acids.

*Preparation of the Coloring-Matters.*

Example *a:* Nine parts of the described 2.5.7-metamidobenzamidonaphtholsulfonic acid are dissolved in about one hundred and fifty parts water and five parts sodium carbonate, and when this solution is cooled with ice there is added to it the solution of diazobenzene derived from twenty-four parts of anilin. The red orange coloring-matter which immediately forms is separated in the usual way by heating, adding sea-salt, pressing, and drying. It dyes non-mordanted cotton in a saline, neutral, or alkaline bath a red orange, which by diazotizing on the fiber and developing by betanaphthol can be transformed into a brighter-red orange, very fast to washing, or can be transformed by diazotizing on the fiber and developing by a metadiamin (metaphenylenediamin or metatoluylenediamin) into a more brownish-red orange, also very fast to washing. If equal quantities of ortho or para diazotoluene be used instead of the diazobenzene, red coloring-matters are obtained, and when diazoxylene or diazocumene is employed scarlet coloring-matters are obtained, while if diazoacetanilid or betadiazonaphthalene is employed bluish-red coloring-matters are obtained, and the shades of all these dyes can by developing on the fiber be transformed into bright tints, fast and very full, varying from yellow to blue red. In the same manner red coloring-matters are prepared by means of the diazo derivatives of the other primary aromatic amins, such as the chloranilins, metanitranilin, the betanaphthylamin-betasulfonic acids, the betanaphthylamin-alphasulfonic acids, the alphanaphthylamin-alphasulfonic acids, or the alphanaphthylamin-betasulfonic acids. The coloring-matters derived from the naphthylamin-sulfonic acids dye red-blue shades, which turn to red on developing with naphthol and to brown-red on developing with a diamin.

Instead of the 2.5.7-metamidobenzamidonaphtholsulfonic acid might also be employed the corresponding ortho or paramidobenzamidonaphtholsulfo acids, as well as the derivatives, (in the benzoic acid nucleus substituted substitution products,) methylated, halogenated, alkyloxylated, and nitrated of the 2.5.7-amidobenzamidonaphtholsulfonic acids. The coloring-matters obtained from the 2.5.7-amido-anisamidonaphtholsulfonic acid (2.5.7-amidomethylparaoxybenzamidonaphtholsulfonic acid) are especially distinguished by the purity of the tints which they give when developed on the fiber. The shades of the coloring-matters deriving from p-amidobenzamidonaphtholic acids are of a bluer-red shade than those deriving from the corresponding meta and ortho derivatives.

Example *b:* Into a solution of 9.5 parts of 2.5.7-metamidobenzamidonaphtholmonosulfonic acid in about five hundred parts water and five parts sodium carbonate is introduced the diazo derivative prepared in the known manner by means of 8.5 parts of dehydrothiotoluidinsulfonic acid. The mixture is heated and the coloring-matter is precipitated by adding common salt. It dyes non-mordanted cotton a bluish red, which can be transformed by diazotation and development with betanaphthol on the fiber into deep red and by development with a diamin into brownish red. There might also be employed the other 2.5.7-amidobenzamidonaphtholsulfonic acids and the derivatives of 2.5.7-amidobenzamidonaphtholsulfonic acids mentioned in Example *a.*

Example *c:* The neutral solution of 9.5 parts of 2.5.7-metamidobenzamidonaphtholsulfonic acid in about two hundred parts water is added to the intermediate product obtained in the usual way by combining the tetrazo derivative resulting from 9.2 parts benzidin, twenty-eight parts hydrochloric acid, and 6.9 parts sodium nitrate with 7.5 parts salicylic acid in a solution rendered alkaline by sodium carbonate.

The coloring-matters thus obtained dye non-mordanted cotton in tints from deep to Bordeaux red, which can be transformed by diazotizing and developing on the fiber by means of beta naphthol or of a diamin into analogous intense tints somewhat more yellowish and fast to washing.

There might also be employed the other 2.5.7-amidobenzamidonaphtholsulfonic acids and the derivatives of 2.5.7-amidobenzamidonaphtholsulfonic acids mentioned in Example *a.*

Instead of the intermediate product derived from benzidin and salicylic acid may also be employed the intermediate products derived from other paradiamins and other oxycarboxylic acids of the benzene and naphthalene series.

What I claim is—

1. The process for the manufacture of azo coloring-matters by first producing a nitrobenzamidonaphtholsulfonic acid by the action of a chlorid of nitrobenzoyl on the 2.5.7-amidonaphtholsulfonic acid, then transforming the said nitrobenzamidonaphtholsulfonic acid into the corresponding amidobenzamidonaphtholsulfonic acid by heating the same with reducing agents, and finally combining the so-obtained amidobenzamidonaphtholsulfonic acid with aromatic diazo bodies in alkaline medium, as described.

2. The process for the manufacture of nitrobenzamidonaphtholsulfonic acids by the action of the chlorids of nitrobenzoyls on the 2.5.7-amidonaphtholsulfonic acid.

3. The process for the manufacture of amidobenzamidonaphtholsulfonic acids by treating the nitrobenzamidonaphtholsulfonic acids obtained by the action of the chlorids of nitrobenzoyls on the 2.5.7-amidonaphtholsulfonic acid with reducing agents.

4. The process for the manufacture of azo coloring-matters by combining 2.5.7-amidobenzamidonaphtholsulfonic acids with aromatic diazo bodies in alkaline medium, as described.

5. As new articles of manufacture, the azo coloring-matters derived from 2.5.7-amidobenzamidonaphtholsulfonic acids, the said coloring-matters being soluble in water and dyeing unmordanted cotton in a saline, neutral or alkaline bath from yellow red to blue red and having the property of developing well on the fiber by being diazotized thereon and ultimately combined with amins or phenols, furnishing red shades which are distinguished by their intensity and brilliance and their extreme fastness to washing.

In witness whereof I have hereunto signed my name in the presence of two subscribing witnesses.

ALBERT BERTSCHMANN.

Witnesses:
GEO. GIFFORD,
ALBERT GRAETER.